(12) United States Patent
Varner

(10) Patent No.: US 6,345,794 B1
(45) Date of Patent: Feb. 12, 2002

(54) ADJUSTABLE POLE HOLDER ADAPTED FOR FORM SUPPORT

(75) Inventor: Richard Varner, Longmont, CO (US)

(73) Assignee: Fusion Specialties, Inc., Broomfield, CO (US)

( * ) Notice: Subject to any disclaimer, the term of this patent is extended or adjusted under 35 U.S.C. 154(b) by 0 days.

(21) Appl. No.: 09/610,756

(22) Filed: Jul. 6, 2000

Related U.S. Application Data

(60) Provisional application No. 60/143,042, filed on Jul. 7, 1999.

(51) Int. Cl.[7] .............................. F16B 1/00; D06C 15/00
(52) U.S. Cl. ...................... 248/230.1; 248/411; 223/68; 403/104
(58) Field of Search ............................. 248/230.1, 161, 248/404, 411, 413, 412, 410, 159; 403/104, 374.1, 373; 223/120, 68

(56) References Cited

U.S. PATENT DOCUMENTS

| | | | |
|---|---|---|---|
| 1,153,634 A | * 9/1915 | Levin | 248/411 |
| 1,547,065 A | 1/1925 | Noble | |
| 2,309,333 A | 1/1943 | Bahr | 248/226 |
| 2,529,173 A | 11/1950 | Moyer et al. | 5/331 |
| 2,842,387 A | * 7/1958 | Della-Porta | 403/324 |
| 3,167,292 A | 1/1965 | Meyerowitz | 248/230 |
| 3,652,047 A | 3/1972 | Starr | 248/230 |
| 4,111,575 A | * 9/1978 | Hoshino | 403/104 |
| 4,140,415 A | * 2/1979 | Koyamato | 403/104 |
| 4,744,690 A | * 5/1988 | Hsieh | 403/104 |
| 5,409,150 A | 4/1995 | Tranquilli | 223/68 |
| D379,142 S | 5/1997 | Miller | D8/71 |
| 6,056,254 A | 5/2000 | Albright et al. | 248/230.1 |
| 6,155,743 A | * 12/2000 | Chen | 403/374.1 |

* cited by examiner

*Primary Examiner*—Anita King
(74) *Attorney, Agent, or Firm*—Greenlee, Winner and Sullivan, P.C.

(57) ABSTRACT

A pole holder is provided which has an outer annular ring, an inner C-shaped partial ring having a circular cross-section with an opening therein, and a screw for exerting pressure on the outer surface of the C-shaped partial ring whereby the size of the opening is reduced with a corresponding reduction in the circumference of the partial ring, causing the partial ring to non-slidably grip the pole. The pole holder permits simple adjustment of the height of an object attached to a pole and can be easily adapted for use with poles of different diameters by changing the partial ring which grips the pole.

16 Claims, 5 Drawing Sheets

ADJUSTABLE POLE HOLDER ADAPTED FOR FORM SUPPORT

REFERENCE TO RELATED APPLICATIONS

This is a utility patent application taking priority from provisional patent application Ser. No. 60/143,042 filed Jul. 7, 1999, which is incorporated herein by reference.

BACKGROUND OF THE INVENTION

Display forms used in the clothing industry are partial, rather than full-body mannequins. They are usually provided with some means for supporting the forms in an upright position so as to display clothing for sale and some means for adjusting the height of the form. Such forms are generally supported on a cylindrical pole secured to a base. In the past, the form was secured by a type of clamping device usually requiring a screw to be tightened until the screw head contacted the pole or a bolt or bolts to be tightened with a wrench. The methods of securing the form to the pole can result in deformation of the pole and damage to the outside surface of the pole. In addition, such screws are often difficult to tighten manually and the need to use a wrench to adjust the display height may prove inconvenient.

A pole holder device produced by Dynacrystal Industrial Corporation, Taipei, Taiwan uses a thumbscrew to secure the pole holder to the pole. This device has a plastic cylindrical housing with an integral flange for attachment to a form. Four equally spaced vertical ridges project from the inner wall of the housing cylinder. The pole is held between two of the ridges and the end of the thumbscrew which is threaded through the wall of the cylindrical housing. Since the end of the screw directly contacts the pole, this device can damage the outside surface of the column. This device is made of plastic and easily broken, leading to a large number of returns of broken devices. In addition, a given device is manufactured for use with only one pole outer diameter size. In order to accommodate different pole outer diameters, multiple pole holders are needed.

U.S. Pat. No. 6,056,254 issued to Albright et al. on May 2, 2000 discloses a column clamp wherein the column or pole is clamped between a generally semi-cylindrical clamping shoe and a semi-cylindrical contact surface formed on the inner surface of the clamp body. A clamping screw attaches to the clamping shoe and applies the clamping pressure. In the embodiment manufactured by Seven Continents, Canada, this device is only able to accommodate a limited range of pole or column outer diameter sizes. For example, one device was able to accommodate a minimum pole diameter of approximately ⅞" and a maximum pole diameter of approximately 1".

SUMMARY OF THE INVENTION

This invention relates generally to a pole holder for securing an object such as a display form to a pole. The pole holder of this invention permits simple adjustment of the height of the object and can be easily adapted for use with poles of different diameters by simply changing the insert which grips the pole. It is easily tightened by hand and resists breakage.

The invention provides a pole holder comprising:
(a) an outer annular ring;
(b) an inner C-shaped partial ring having a circular cross-section with an opening therein, said partial ring having an outer surface and an inner gripping surface, and being sized to fit within said outer annular ring, said inner partial ring being adapted in use to fit around the circumference of a pole;
(c) means for exerting pressure on the outer surface of said C-shaped partial ring whereby the size of said opening is reduced with a corresponding reduction in the circumference of said partial ring, whereby said inner gripping surface non-slidably grips said pole.

This invention also provides a pole holder kit comprising:
(a) an outer annular ring;
(b) a plurality of inner C-shaped partial rings, each inner C-shaped partial ring having a circular cross-section with an opening therein, each said partial ring having an outer surface and an inner gripping surface, and being sized to fit within said outer annular ring, wherein each said inner partial ring is adapted in use to fit around the circumference of a pole with a different outside diameter;
(c) means for exerting pressure on the outer surface of said C-shaped partial ring whereby the size of said opening is reduced with a corresponding reduction in the circumference of said partial ring, whereby said inner gripping surface non-slidably grips said pole.

This invention also provides a method for making a pole holder comprising:
a) providing an outer annular ring;
b) providing an inner C-shaped partial ring having a circular cross-section with an opening therein, said partial ring having an outer surface and an inner gripping surface, and being sized to fit within said outer annular ring, said inner partial ring being adapted in use to fit around the circumference of a pole;
(c) providing means for exerting pressure on the outer surface of said C-shaped partial ring whereby the size of said opening is reduced with a corresponding reduction in the circumference of said partial ring, whereby said inner gripping surface non-slidably grips said pole
(d) assembling the pole holder by inserting said inner C-shaped partial ring into said outer ring and attaching the means for exerting pressure on the outer surface of said C-shaped partial ring.

This invention also provides a method for adjustably attaching an object to a pole comprising attaching a pole holder of this invention to said object, sliding the pole through the pole holder, and tightening said pole holder so that it non-slidably grips said pole.

The term "pole holder" means a device which is placed around the circumference of a pole and which can be mechanically adjusted to non-slidably grip the pole. A pole is defined as a generally cylindrical column which may be solid or hollow. The pole exterior may have a painted or slippery surface. Typical pole diameters used for forms are ⅝" outer diameter, ⅞" outer diameter, and 1" outer diameter.

The term ring is defined as an object which in cross-section has a generally circular form with a vacant generally circular center. The outside surface of a ring forms the outer wall of the ring while the inside surface forms the inner wall of the ring. A ring may have projections or cutouts from the inner or outer wall which may cause the inner or outer wall of the ring to deviate from a circular shape in cross-section. A ring may also contain voids. The height of a ring is measured in the direction perpendicular to the inner and outer diameter of the ring. The height of the inner ring may be any height which allows the inner ring to non-slidably grip a pole. The height of the outer ring may be any height which is compatible with the height of the inner ring. The outer diameter of a ring may vary along its height, resulting in a conical outer wall.

A partial ring is a ring having an opening which extends from the inner to the outer wall of the ring. Therefore, a partial ring has an arc less than 360 degrees. A C-shaped ring is a partial ring which has an arc greater than 180 degrees, preferably greater than 270 degrees.

The inner C-shaped ring is preferably made of a material capable of compressing under pressure applied by hand-operated means, such as a thumb screw, so that the diameter of the inner ring is reduced and it grips the pole tightly. The inner C-shaped ring has an inner surface, referred to herein as a "gripping surface," which in combination with the pole has a coefficient of friction which provides sufficient frictional force to hold the pole so that it does not slide when pressure is applied to the inner ring. The required amount of frictional force may be obtained by one skilled in the art without undue experimentation by providing a rough or non-slick surface or other surface which in combination with the pole has a coefficient of friction which prevents sliding of the pole when the pole holder is tightened, but allows the pole to slide therein when not tightened. Preferably, the inner C-shaped ring is made from plastic such as nylon. Use of a plastic inner ring limits marring of the pole surface by the element of the device which grips the pole.

The outer annular ring of the pole holder is pierced to receive the shaft of the screw or other means for exerting pressure so that the end of the screw or other means for exerting pressure exerts pressure on the outer surface of the C-shaped member. If the means for exerting pressure is a screw, the opening in the outer ring of the pole holder may be threaded for engaging the screw shaft. Preferably the outer annular ring is made of metal, but it may be made of any material providing sufficient rigidity to hold the other components. The outer ring may be equipped with a flange for attachment to an object to be attached to a pole, or it may be directly attached to the object, e.g. by means of screws engaging with screw holes in the outer ring, adhesive, or other means known in the art.

The pole holders of this invention are suitable for attaching any object to a pole. Preferred embodiments are used to attach forms or full mannequins to a pole.

DETAILED DESCRIPTION OF THE PREFERRED EMBODIMENTS

Figure 1:
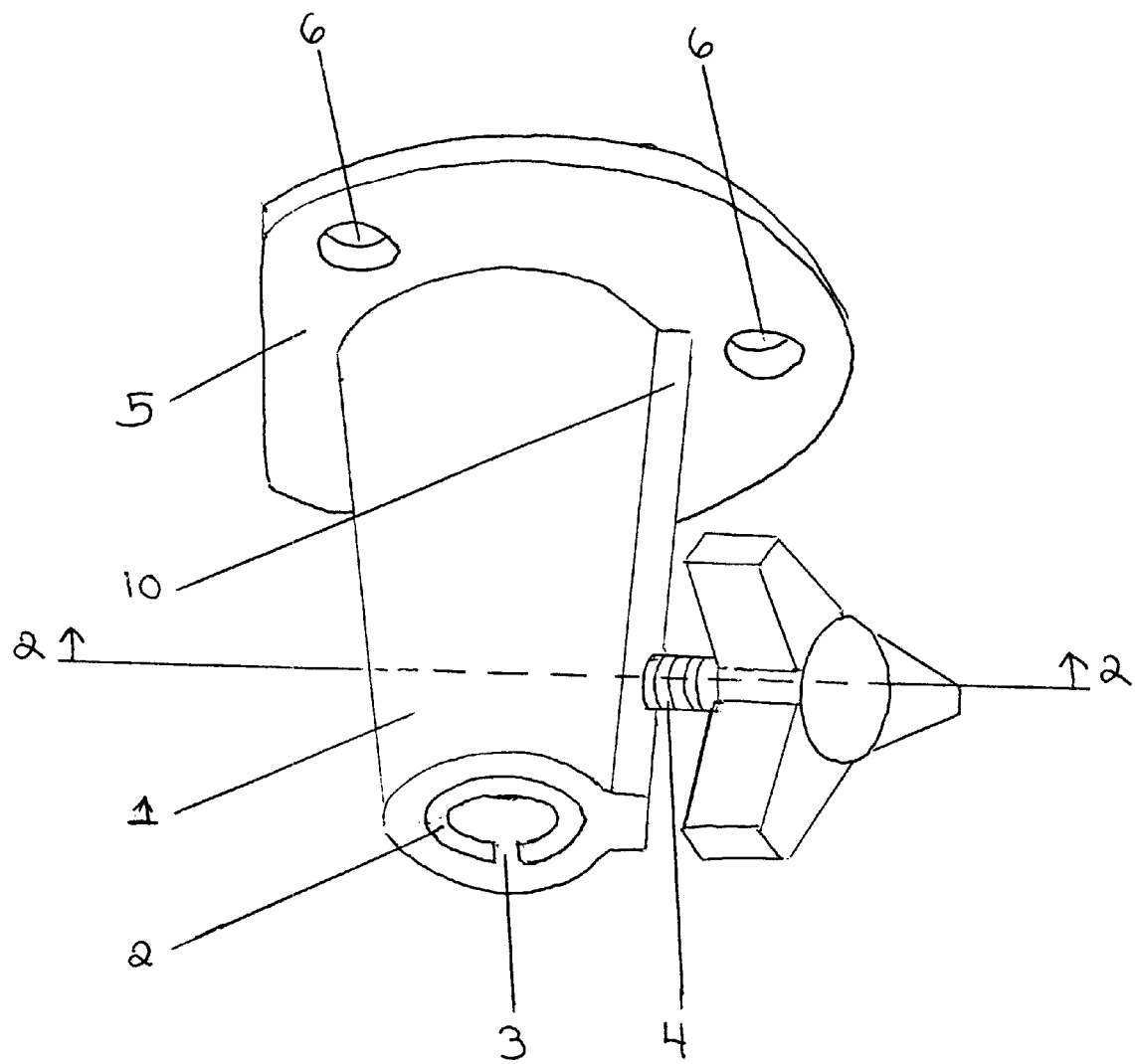
FIG. 1 shows a pole holder of this invention.

FIG. 1 shows a pole holder of this invention comprising an outer annular ring 1, an inner C-shaped partial ring 2 with opening 3, and a means for exerting pressure 4 on the outer surface of the partial ring 2. In FIG. 1, the means for exerting pressure 4 is shown as a thumbscrew. Other means for compressing the C-shaped ring include bars, clamps, bolts, and screws which may be tightened manually, or using a wrench, as will be readily apparent to those skilled in the art without undue experimentation. In the preferred embodiment, the outer ring 1 and C-shaped partial ring 2 are sleeves, with the outer surface of outer ring 1 being roughly frusto-conical. FIG. 1 also shows a flange 5 attached to the outer annular ring 1. In a preferred embodiment the flange and outer annular ring are made of metal as a single piece. As shown, the flange 5 contains holes 6 for securing the flange to the object to be attached to the pole. For FIGS. 1–5, the top of the pole holder is defined as the flange end of the pole holder and looking upward is defined as looking toward the flange end of the pole holder. The outer annular ring 1 has a ridge 10 projecting outward from its outer surface.

Figure 2:
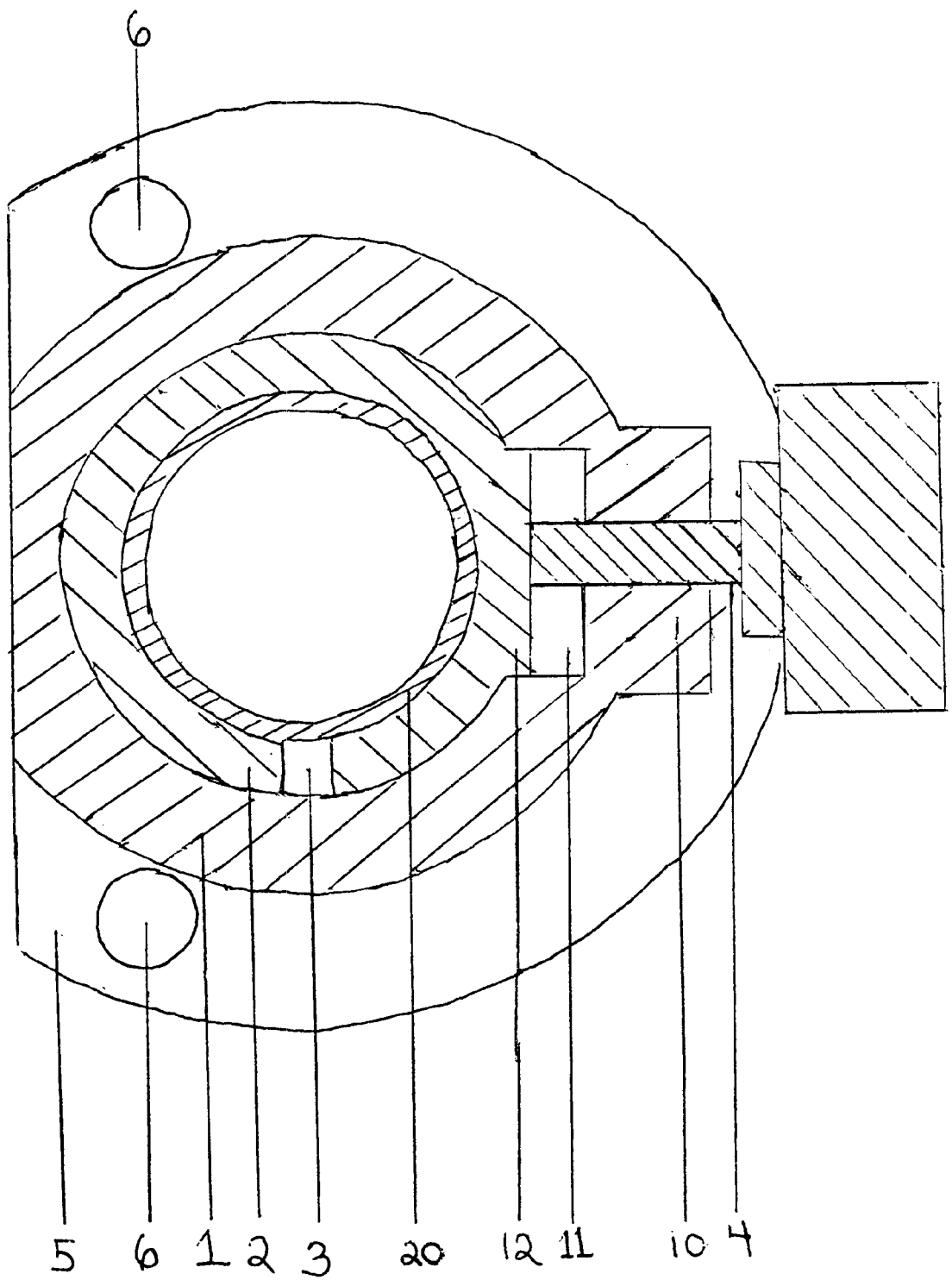
FIG. 2 shows a sectional view of the pole holder taken along the line 2—2 of FIG. 1 and looking toward the flange.

FIG. 2 shows a sectional view of the pole holder taken along the line 2—2 of FIG. 1 and looking upward toward the flange. A pole 20 is inserted in the holder. Once the end of the thumbscrew 4 touches the C-shaped partial inner ring 2 as shown in FIG. 2, further tightening of the thumbscrew compresses the partial inner ring 2 between the end of the thumbscrew and the inner wall of the outer annular ring 1. As the C-shaped partial inner ring 2 is compressed, the edges of the "C" move toward each other, reducing the size of opening 3 and reducing the diameter of the inner ring so that it grips the pole tightly.

FIG. 2 shows a pole holder design where the inner C-shaped ring 2 is formed with a key 12 projecting outward from its outer surface. The key shown in FIG. 2 has a generally flat outer surface. The inner wall of outer ring 1 is formed with a keyway 11 for receiving the key 12. In the pole holder design shown in FIG. 2, the interlocking of the key and keyway limits rotation of the inner ring within the outer ring. In addition, the flat outer surface of the key provides a flat surface for the end of the thumbscrew to contact the inner ring. As shown in FIG. 2, the outermost inner surface of ridge 10 is the outermost surface of keyway 11.

Figure 3A:
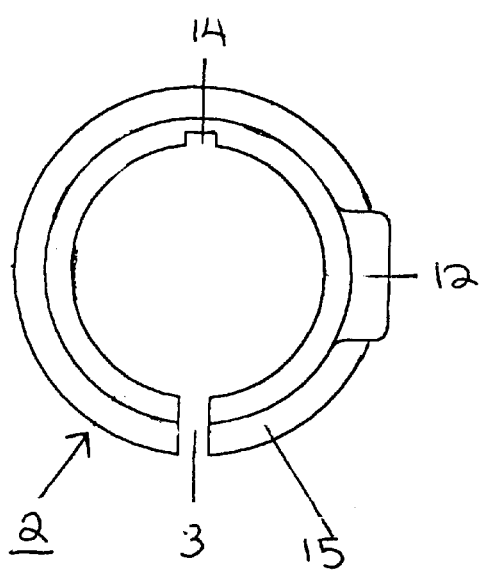
FIG. 3A is a view of the bottom of the inner ring of another embodiment of the pole holder of this invention, looking upward.
Figure 3B:
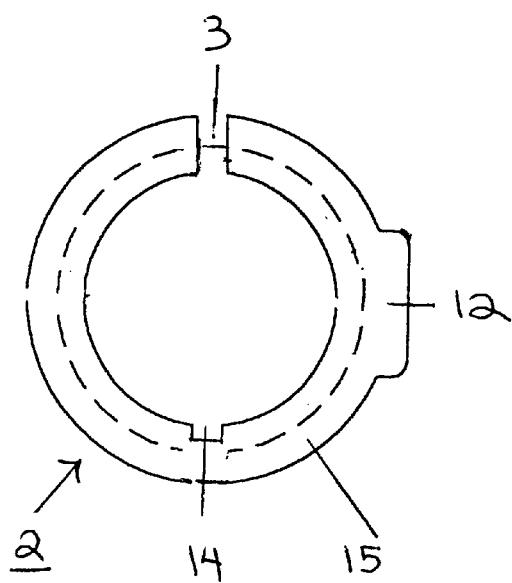
FIG. 3B is a view of the top of the inner ring of FIG. 3A, looking downward.
Figure 3C:
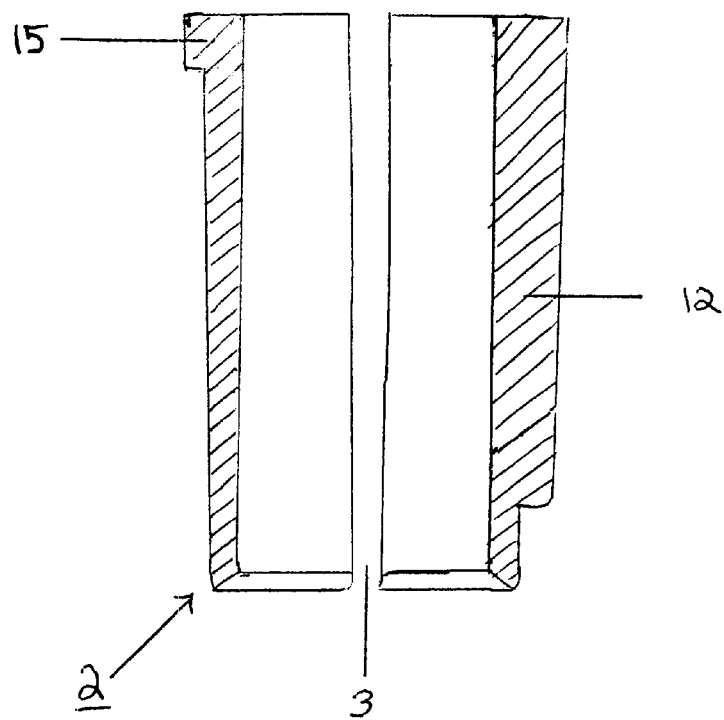
FIG. 3C is a vertical cross-section of the inner ring of FIG. 3A, looking toward the opening in the ring.

FIGS. 3A through 3C show detailed drawings of an inner ring design for another pole holder. FIG. 3A is a view of the bottom of the inner ring 2 of another pole holder, looking upward. FIG. 3A shows a cutout 14 in the wall of the inner ring 2 opposite the ring opening 3. The cutout 14 extends from the top to the bottom of the inner ring and provides a bend point during compression of the inner ring. FIG. 3A also shows projection 15 at the top of inner ring 2 and key 12. FIG. 3B is a view of the top of the inner ring of FIG. 3A, looking downward. FIG. 3C is a vertical cross-section of the inner ring of FIG. 3A, looking toward the opening 3 in the ring. The opening 3 in the inner ring narrows from the top to the bottom of the ring. FIG. 3C also shows that the bottom of the inner ring 2 is angled upward from the outside to the inside of the ring.

Figure 4:
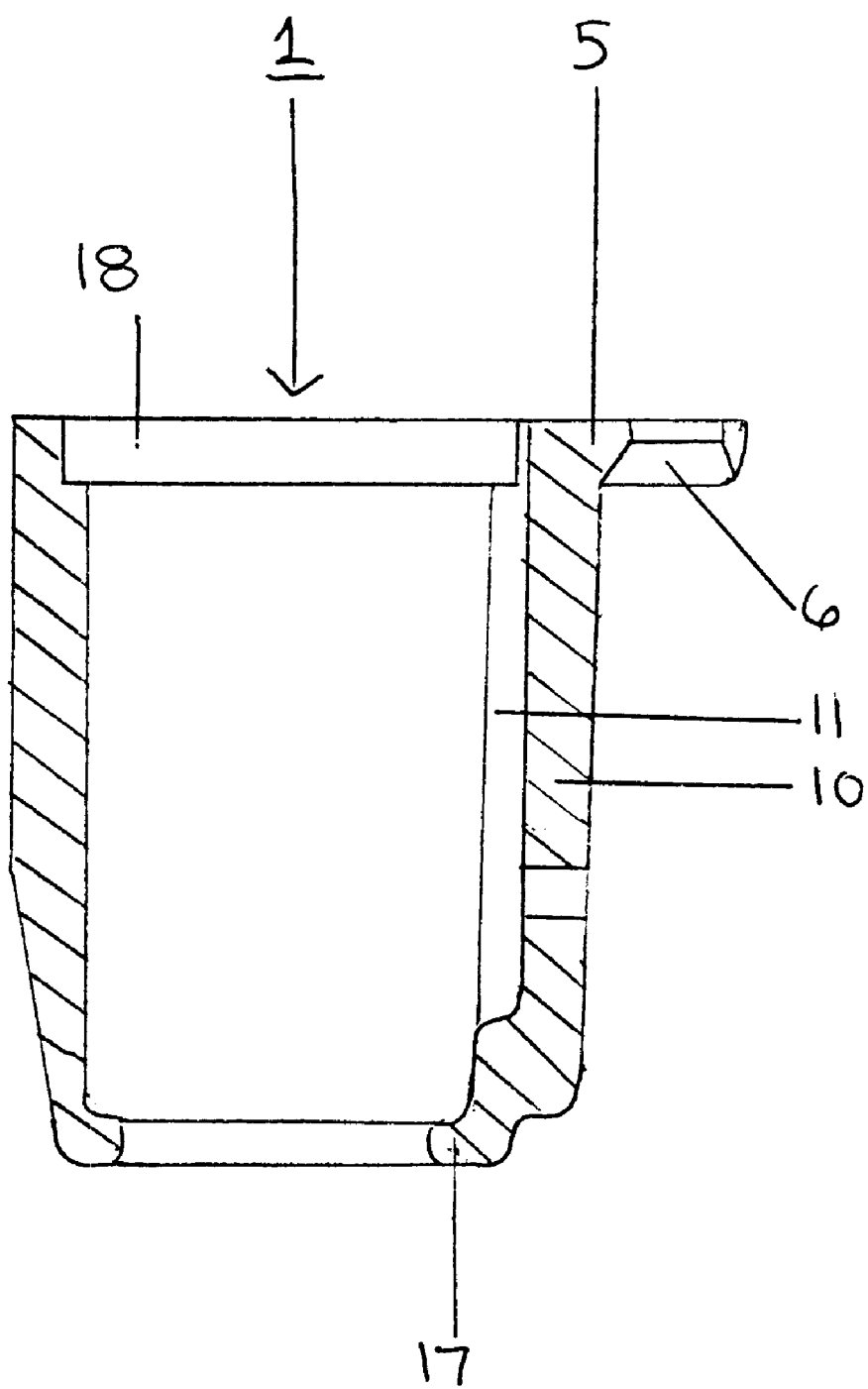
FIG. 4 is a vertical cross-section of an outer ring which is compatible with the inner ring shown in FIGS. 3A–C.

FIG. 4 is a vertical cross-section of an outer zing 1 which is compatible with the inner ring shown in FIGS. 3A-C. The inner ring is not shown in FIG. 4. FIG. 4 shows a lip 17 on the bottom of outer ring 1 which prevents the inner ring from sliding out from the outer ring. FIG. 4 also shows recess 18 which accommodates projection 15 from tie inner ring. The flange 5, a flange hole 6, the ridge 10, and the keyway 11 are also shown.

The pole holder designs shown in FIGS. 1–5 are assembled by inserting the inner C-shaped ring into the outer ring and threading the thumbscrew through the pierced opening in the outer ring. The inner ring can be subsequently removed from the outer ring by loosening the thumbscrew as necessary. Therefore, inner rings with different inner diameters can be used as removable inserts to accommodate different pole diameters.

Figure 5:
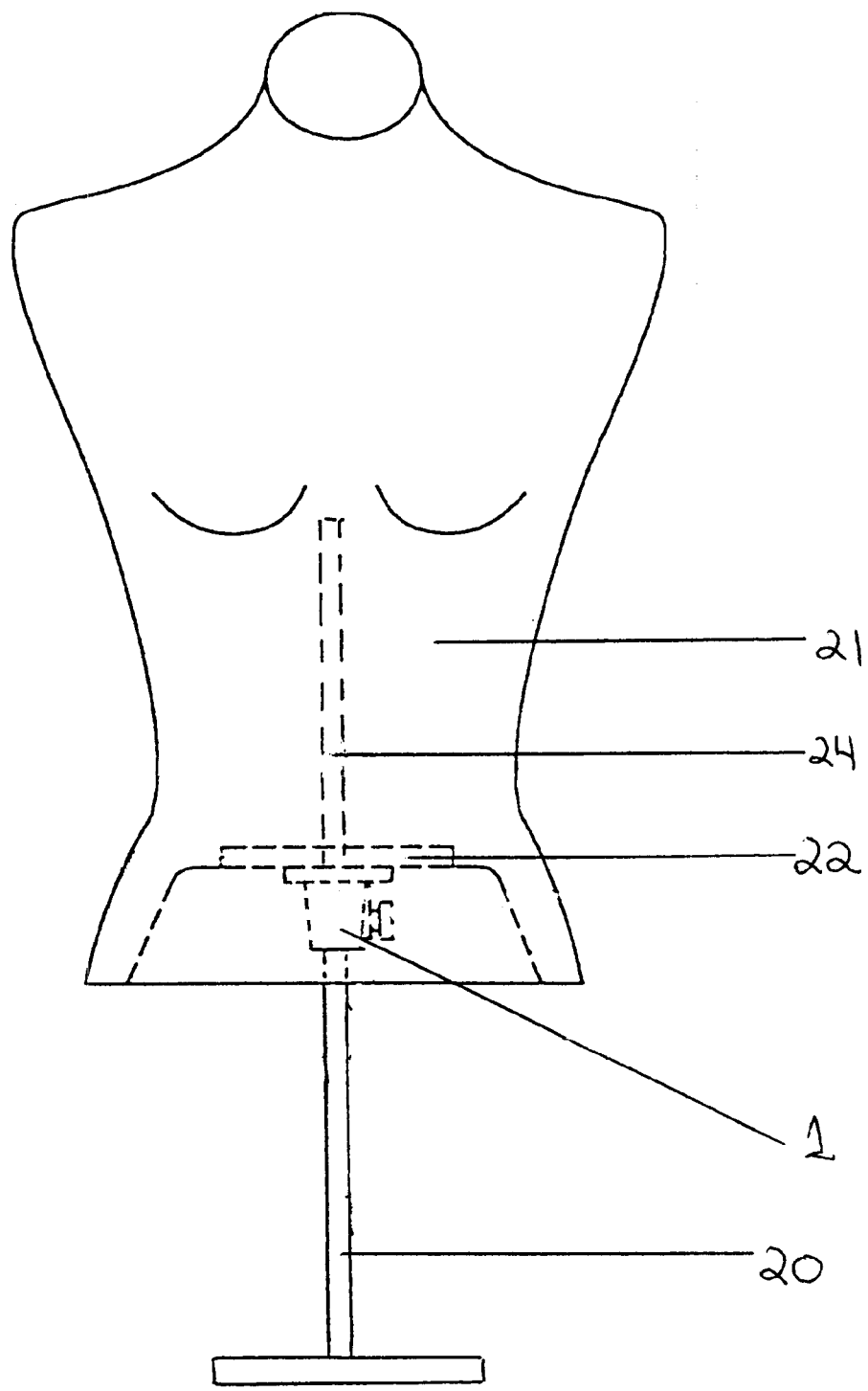
FIG. 5 shows the attachment of a pole holder to a clothing mannequin.
Figure 1:
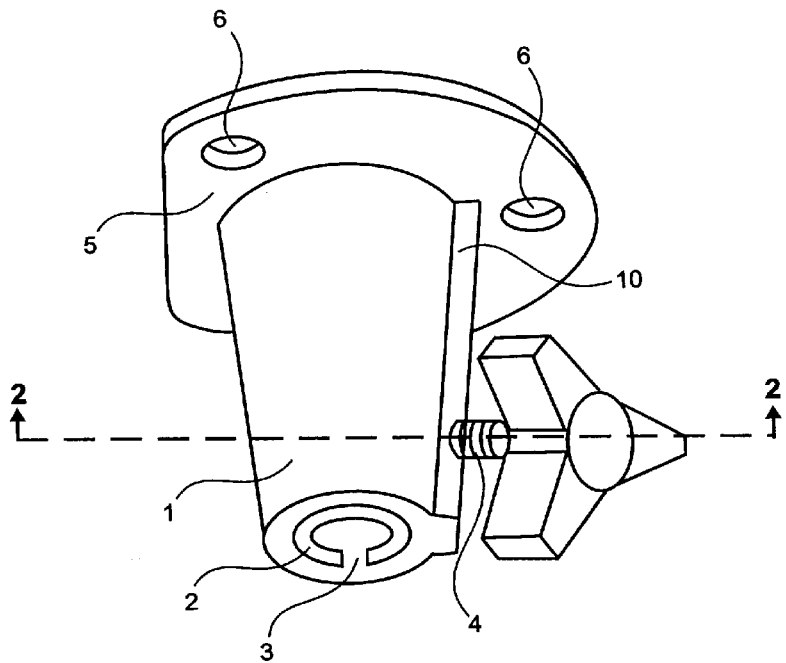
Figure 2:
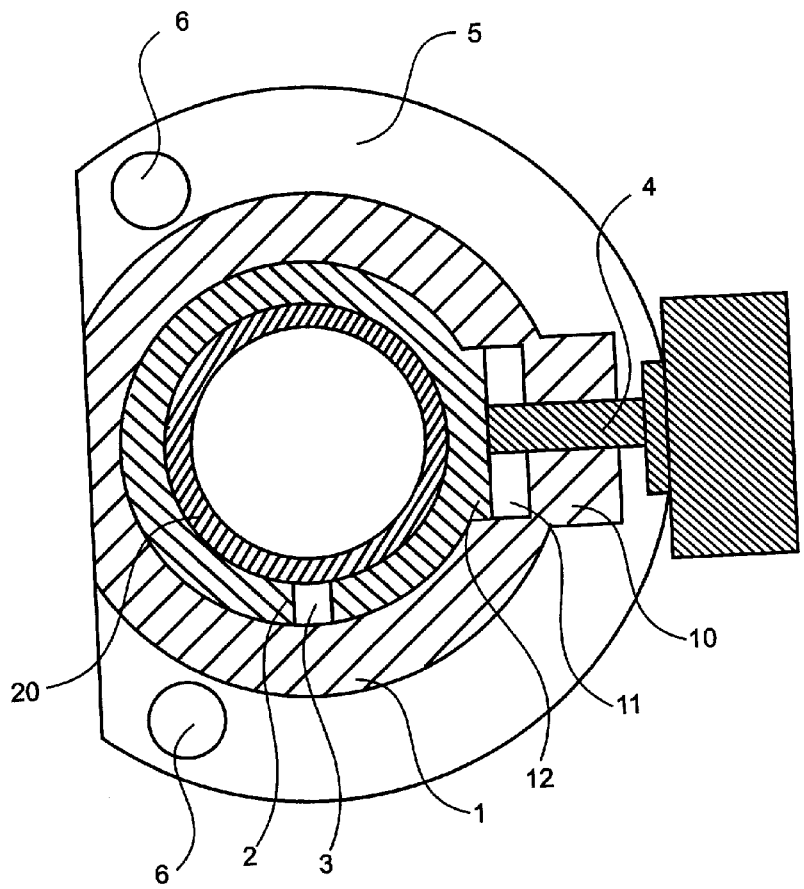
Figures 3A, 3B:
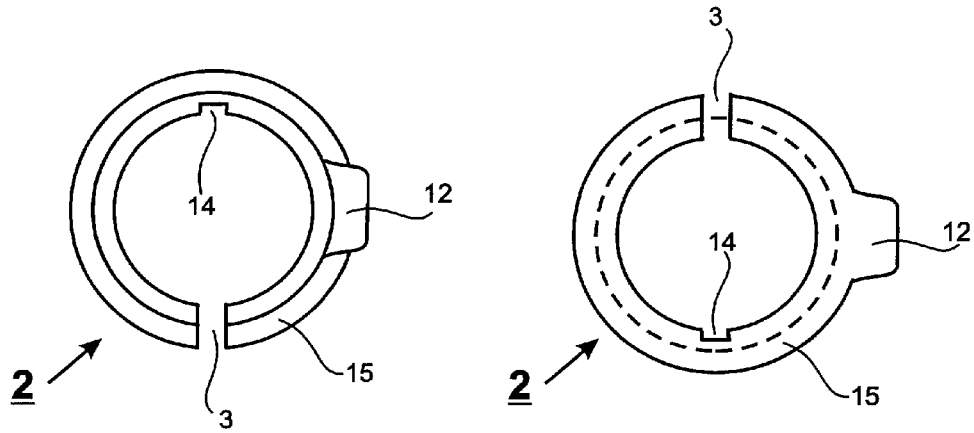
Figure 3C:
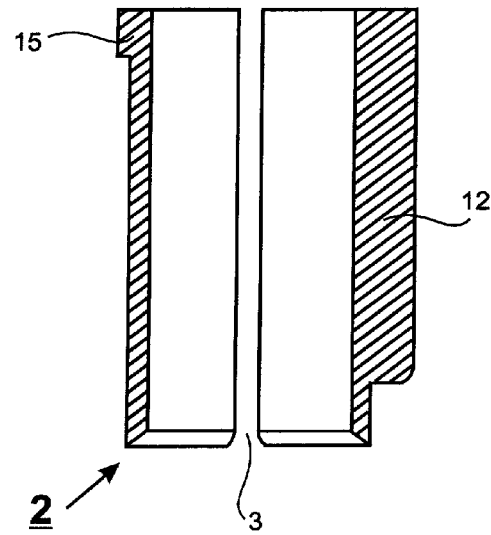
Figure 4:
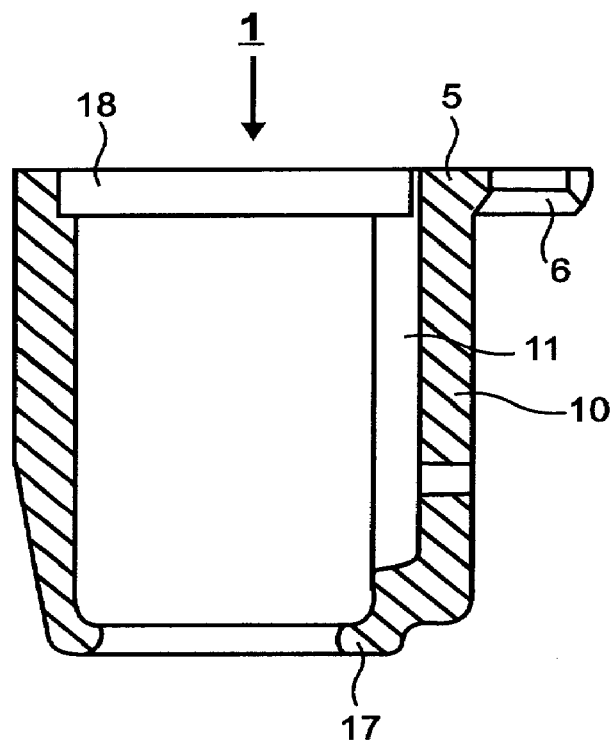
Figure 5:
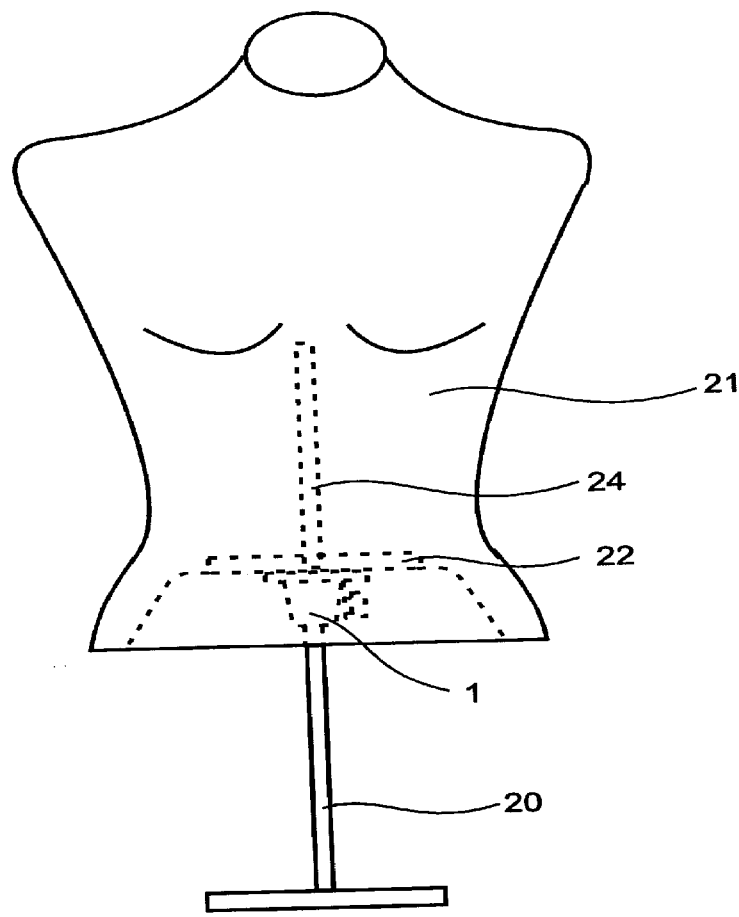

This invention also provides a method for adjustably attaching an object to a pole comprising attaching a pole holder of this invention to said object, sliding the pole through the pole holder, and tightening said pole holder so that it non-slidably grips said pole. The object to be secured to a pole may be a mannequin for display of clothing as shown in FIG. 5. Such an object 21 generally has a base 22 to which a pole holder may be attached and an opening 24 for receiving a portion of the pole 20, as shown in FIG. 5.

The preferred embodiments described above are illustrative rather than limiting of the invention. As will be readily understood by those skilled in the art, various materials, processes and parameters can be varied to achieve the objectives of this invention. The invention is limited only by the scope of the claims appended hereto.

What is claimed is:

1. A pole holder comprising:
   (a) an outer annular ring;
   (b) an inner C-shaped partial ring having a circular cross-section with an opening therein, said partial ring having an outer surface and an inner gripping surface, and being sized to fit within said outer annular ring, said inner partial ring being adapted in use to fit around the circumference of a pole; and
   (c) means for exerting pressure on the outer surface of said C-shaped partial ring, said means contacting the outer surface at a point spaced apart from the ends of said partial ring, whereby the size of said opening is reduced with a corresponding reduction in the circumference of said partial ring, whereby said inner gripping surface non-slidably grips said pole.

2. The pole holder of claim 1, additionally comprising a flange rigidly connected to the outer ring, said flange adapted to be affixed to an object to be secured to said pole.

3. The pole holder of claim 1, wherein the outer ring is made of metal.

4. The pole holder of claim 3, wherein the outer ring is made of aluminum.

5. The pole holder of claim 1, wherein the inner ring is made of plastic.

6. The pole holder of claim 5, wherein the inner ring is made of nylon.

7. The pole holder of claim 3, wherein the inner ring is made of plastic.

8. The pole holder of claim 2, wherein the outer ring is made of metal and the inner ring is made of plastic.

9. The pole holder of claim 1, wherein the means for exerting pressure on the outer surface of said partial ring comprises a thumbscrew and said thumbscrew passes though a hole made in said outer annular ring.

10. The pole holder of claim 9, additionally comprising a key projecting from the outer surface of said inner partial ring and a keyway for receiving said key formed in the outer ring.

11. The pole holder of claim 10, wherein said thumbscrew passes through the keyway of said outer ring and contacts the key of said inner partial ring.

12. The pole holder of claim 11, wherein the outer ring is made of metal and the inner partial ring is made of plastic.

13. A pole holder kit comprising:
   (a) an outer annular ring;
   (b) a plurality of inner C-shaped partial rings, each inner C-shaped partial ring having a circular cross-section with an opening therein, each said partial ring having an outer surface and an inner gripping surface, and being sized to fit within said outer annular ring, wherein each said inner partial ring is adapted in use to fit around the circumference of a pole with a different outside diameter; and
   (c) means for exerting pressure on the outer surface of said C-shaped partial ring, said means contacting the outer surface at a point spaced apart from the ends of said partial ring, whereby the size of said opening is reduced with a corresponding reduction in the circumference of said partial ring, whereby said inner gripping surface non-slidably grips said pole.

14. A method for making a pole holder comprising the steps of:
   a) providing an outer annular ring;
   b) providing an inner C-shaped partial ring having a circular cross-section with an opening therein, said partial ring having an outer surface and an inner gripping surface, sized to fit within said outer annular ring, said inner partial ring being adapted in use to fit around the circumference of a pole;
   (c) providing means for exerting pressure on the outer surface of said C-shaped partial ring, said means contacting the outer surface at a point spaced apart from the ends of said partial ring, whereby the size of said opening is reduced with a corresponding reduction in the circumference of said partial ring, whereby said inner gripping surface non-slidably grips said pole; and
   (d) assembling the pole holder by inserting said inner C-shaped partial ring into said outer ring and attaching the means for exerting pressure on the outer surface of said C-shaped partial ring.

15. A method for adjustably attaching an object to a pole comprising the steps of:
   (a) attaching the pole holder of claim 1 to said object;
   (b) sliding the pole through said pole holder; and
   (c) tightening said pole holder so that it non-slidably grips said pole.

16. A method for adjustably attaching an object to a pole comprising the steps of:
   (a) attaching the pole holder of claim 12 to said object;
   (b) sliding the pole through said pole holder; and
   (c) tightening said pole holder so that it non-slidably grips said pole.

* * * * *

UNITED STATES PATENT AND TRADEMARK OFFICE
CERTIFICATE OF CORRECTION

PATENT NO. : 6,345,794 B1
DATED : February 12, 2002
INVENTOR(S) : Richard Varner It is certified that error appears in the above-identified patent and that said Letters Patent is hereby corrected as shown below:

Drawings,
Please replace Figs. 1-5 with the formal drawings attached hereto:

Column 4,
Line 54, please replace "zing" with -- ring --.
Line 59, please replace "tie" with -- the --.

Signed and Sealed this

Thirtieth Day of July, 2002

Attest:

JAMES E. ROGAN
Attesting Officer    Director of the United States Patent and Trademark Office